(12) United States Patent
Morrison et al.

(10) Patent No.: US 8,378,685 B2
(45) Date of Patent: Feb. 19, 2013

(54) SURVEYING A SUBTERRANEAN STRUCTURE USING A VERTICALLY ORIENTED ELECTROMAGNETIC SOURCE

(75) Inventors: H. Frank Morrison, Berkeley, CA (US); David L. Alumbaugh, Berkeley, CA (US); Nestor Cuevas, Albany, CA (US)

(73) Assignee: WesternGeco L.L.C., Houston, TX (US)

( * ) Notice: Subject to any disclaimer, the term of this patent is extended or adjusted under 35 U.S.C. 154(b) by 392 days.

(21) Appl. No.: 12/728,606

(22) Filed: Mar. 22, 2010

(65) Prior Publication Data

US 2011/0227579 A1 Sep. 22, 2011

(51) Int. Cl.
*G01V 3/08* (2006.01)
(52) U.S. Cl. ........................................................ 324/344
(58) Field of Classification Search .......................... None
See application file for complete search history.

(56) References Cited

U.S. PATENT DOCUMENTS

| | | | |
|---|---|---|---|
| 2,582,314 A | 1/1952 | Doll | |
| 4,617,518 A | 10/1986 | Srnka | |
| 5,668,475 A | 9/1997 | Orban et al. | |
| 6,628,119 B1 | 9/2003 | Eidesmo et al. | |
| 6,690,170 B2 | 2/2004 | Homan et al. | |
| 7,030,617 B2 | 4/2006 | Conti | |
| 7,483,792 B2 * | 1/2009 | MacGregor et al. | 702/2 |
| 8,019,548 B2 * | 9/2011 | Lovatini et al. | 702/11 |
| 8,253,418 B2 * | 8/2012 | Constable et al. | 324/365 |
| 8,265,913 B2 * | 9/2012 | MacGregor et al. | 324/323 |
| 8,275,592 B2 * | 9/2012 | Lovatini et al. | 702/6 |
| 2003/0043692 A1 * | 3/2003 | Ellingsrud et al. | 367/37 |
| 2006/0186889 A1 * | 8/2006 | Andreis | 324/345 |
| 2007/0075708 A1 * | 4/2007 | Reddig et al. | 324/337 |
| 2007/0135974 A1 | 6/2007 | Fielding et al. | |
| 2009/0140741 A1 * | 6/2009 | Tenghamn et al. | 324/347 |
| 2010/0013485 A1 * | 1/2010 | Alumbaugh et al. | 324/337 |
| 2011/0001482 A1 * | 1/2011 | Alumbaugh et al. | 324/344 |
| 2011/0210743 A1 * | 9/2011 | Tompkins et al. | 324/338 |
| 2012/0116679 A1 * | 5/2012 | Alumbaugh et al. | 324/337 |
| 2012/0223718 A1 * | 9/2012 | Peppe et al. | 324/365 |

FOREIGN PATENT DOCUMENTS

| | | |
|---|---|---|
| WO | 2004008183 A2 | 1/2004 |
| WO | 2007053025 A1 | 5/2007 |
| WO | 2007089486 A2 | 8/2007 |
| WO | 2007091086 A2 | 8/2007 |

OTHER PUBLICATIONS

International Search Report and Written Opinion of PCT Application Serial No. PCT/US2011/029280 dated Nov. 29, 2011.
Chave, et al., Electrical Exploration Methods for the Seafloor, Society of Exploration Geophysicists, 1991, pp. 931-966.

* cited by examiner

*Primary Examiner* — Jermele M Hollington

(57) ABSTRACT

To perform a marine survey of a subterranean structure, a vertically oriented electromagnetic (EM) source is positioned in a body of water, where the EM source is coincident with an EM receiver. The EM source is activated to cause transmission of EM energy into the subterranean structure. After deactivation of the EM source, an EM field affected by the subterranean structure is measured by the EM receiver. In an alternative implementation, a survey system is provided that has a continuous wave EM source, a main EM receiver, and an auxiliary EM receiver.

15 Claims, 9 Drawing Sheets

SURVEYING A SUBTERRANEAN STRUCTURE USING A VERTICALLY ORIENTED ELECTROMAGNETIC SOURCE

BACKGROUND

A controlled source electromagnetic (CSEM) survey technique can be used to perform a survey of a subterranean structure for identifying elements of interest, such as hydrocarbon-bearing reservoirs, gas injection zones, thin carbonate or salt layers, fresh-water aquifers, and so forth. With CSEM surveying, an electromagnetic (EM) transmitter is used to generate EM signals. EM receivers can be deployed in an area of interest to make measurements from which information about the subterranean structure can be derived. The EM receivers may include a number of sensors for detecting any combination of electric fields, electric currents, and magnetic fields.

In some marine CSEM survey arrangements, the EM receivers can be provided on the water bottom surface, such as the sea floor. In other marine survey arrangements, the EM receivers can be towed by a marine vessel. When sea floor EM receivers are used, a substantial amount of time can be spent deploying the EM receivers. On the other hand, in a fully towed system, the cables that carry the EM receivers are relatively long, since typical CSEM survey arrangements involve making measurements at multiple source-receiver offsets.

SUMMARY

In general, according to an embodiment, a method of performing a marine survey of a subterranean structure includes positioning a vertically oriented electromagnetic (EM) source in a body of water, where the EM source is coincident with an EM receiver. The EM source is activated to cause transmission of EM energy into the subterranean structure. After deactivation of the EM source, an EM field affected by the subterranean structure is measured by the EM receiver.

In general, according to another embodiment, a survey system includes a continuous wave electromagnetic (EM) source, wherein the continuous wave EM source is vertically oriented and is for provision in a body of water. A main EM receiver measures an EM field responsive to the EM source that is affected by a subterranean structure, and an auxiliary EM receiver measures a primary field of the EM source.

Other or alternative features will become apparent from the following description, from the drawings, and from the claims.

BRIEF DESCRIPTION OF THE DRAWINGS

Some embodiments of the invention are described with respect to the following figures.

DETAILED DESCRIPTION

Figure 1:
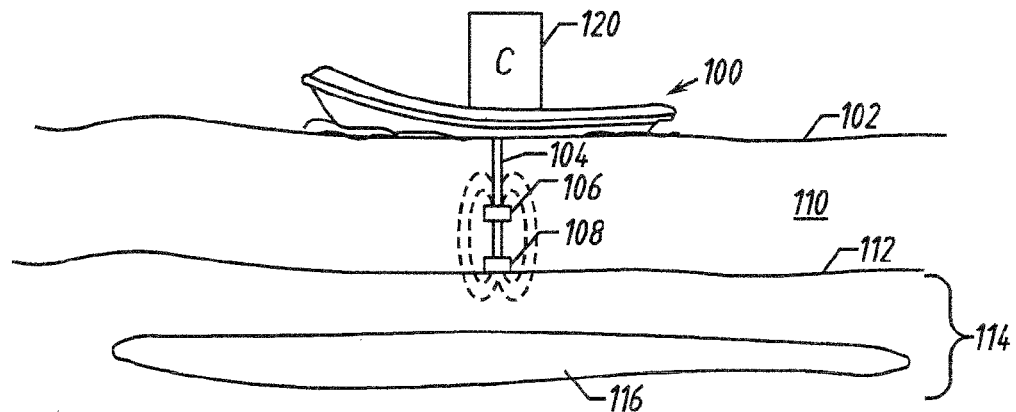
FIG. 1 illustrates an example arrangement for performing a controlled source electromagnetic (CSEM) survey, in which a stationary electromagnetic (EM) source/receiver assembly is provided in a body of water, according to an embodiment.

In accordance with some embodiments, a system for performing a controlled source electromagnetic (CSEM) survey uses a vertically oriented electromagnetic (EM) source that is coincident with an EM receiver. The EM source with the coincident EM receiver are part of an EM source/receiver assembly. In some embodiments, the vertically oriented EM source is a vertical electrical dipole that has a pair of electrodes. The EM receiver can also be implemented with a dipole.

More generally, a vertically oriented EM source refers to an EM source in which EM fields are generated in response to electrical current flowing in a generally vertical direction, which is the direction that is generally perpendicular to a thin body of interest within the subterranean structure. It is noted that a vertically oriented EM source can refer to an EM source that is oriented in either a vertical direction or at a slight angle with respect to the vertical direction, where the slight angle can be less than or equal to 10°.

An EM receiver being "coincident" with an EM source means that the EM receiver shares the same antenna structure of the EM source, or that the EM receiver has an antenna structure that is relatively near the antenna structure of the EM source, where "near" means that the EM receiver is less than or equal to 50 meters (m) away from the EM source. In other embodiments, "near" can mean less than or equal to 20 meters, 10 meters, or 5 meters.

In some embodiments, the EM source is activated and then deactivated, with the EM receiver used to measure an EM response of the subterranean structure (that is responsive to the EM energy transmitted into the subterranean structure by the EM source) over time. The EM response is a decaying EM field over time (since the EM source has been deactivated).

In some implementations, the EM source/receiver assembly can be spaced above a water bottom surface (e.g., sea floor). The EM source/receiver assembly is spaced above the water bottom surface if there is a non-zero spacing between the EM source/receiver assembly and the water bottom surface. In an alternative implementation, one or more electrodes of the EM source/receiver assembly can be in contact with the water bottom surface (e.g., sea floor).

Measuring the EM response after the EM source has been deactivated (turned off) ensures that only the secondary or scattered EM field produced by the subterranean structure (and body of water) is measured. In other words, the EM receiver does not measure the primary field, which is the field that would exist when the EM source is activated (on) in the absence of the subterranean structure. The primary field has no information about the conductivity of the subterranean structure.

In alternative embodiments, instead of using an EM source/receiver assembly in which the EM source is deactivated to allow the EM receiver to obtain a response in the absence of the primary field, the EM source can be continuously activated to transmit a continuous EM wave. In such embodiments, the EM source/receiver assembly can be provided with an additional mechanism to allow for the primary field to be removed (bucked out) from the total measured response. This bucking mechanism is described further below.

FIG. 1 illustrates an example CSEM survey arrangement that includes a marine vessel 100 located at the water surface 102. A support structure 104 depends from the bottom of the marine vessel 100, where the support structure 104 carries a pair of electrodes 106, 108 in the body of water 110. The support structure 104 can be a rigid support structure to maintain the vertical orientation of the electrodes 106, 108. The pair of electrodes 106 and 108 provides a dipole when the electrodes are energized by an electrical current passing through an electrically conductive medium in the support structure or cable 104 to the electrodes 106 and 108.

In the embodiment of FIG. 1, the same electrodes 106 and 108 are used for the EM receiver, such that the EM source and the EM receiver share the same set of electrodes.

The dipole formed by electrodes 106 and 108 is a vertical dipole since the electrical current flows in the vertical direction between electrodes 106 and 108. It is noted that the vertical orientation of the EM source and EM receiver maximizes the response of resistive targets at depth in a subterranean structure 114, and minimizes the response of conductive sediments in the body of water 110.

When the electrodes 106, 108 are activated by passing current through an electrically conductive medium of the support structure or cable 104 to the electrodes 106, 108, EM energy is transmitted into the subterranean structure 114 underneath the water bottom surface 112 (e.g., sea floor). The subterranean structure 114 has a body of interest (or multiple bodies of interest) 116, such as hydrocarbon-bearing reservoirs, gas injection zones, thin carbonate or salt layers, freshwater aquifers, and so forth. EM signals perturbed or affected by the subterranean structure 114 are detected by the EM receiver (formed of the same electrodes 106, 108) after the EM source has been deactivated.

In some embodiments, the source waveform generated by the EM source can be a square wave that has a particular duty cycle (e.g., 50% duty cycle), where the square wave is turned on for a first amount of time and shut off for a second amount of time to define the square wave, and the ratio between the first amount of time (the on time) and the second amount time (the off time) defines the duty cycle. Instead of a square wave, the EM source can produce other types of time varying waveforms, such as an impulse, a half-sine wave, or any other type of waveform. Measurements can be made both during the time that the EM source is on, as well as the time when the EM source is off. Measurements made when the EM source is off provide information regarding bodies of interest in the subterranean structure 114 (since the primary field is absent).

Figure 2:
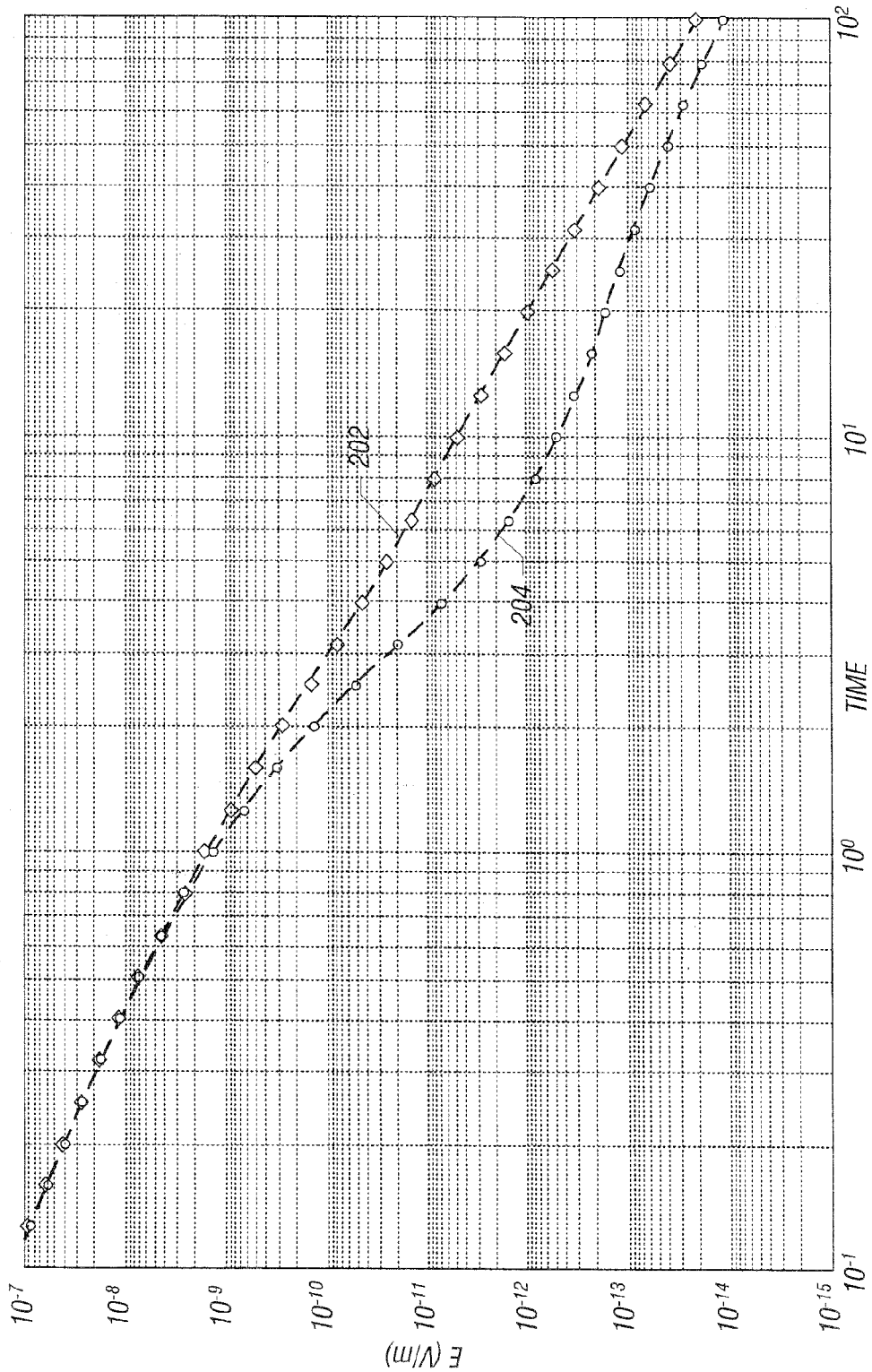
FIG. 2 is a graph showing the EM response over time after the EM source of FIG. 1 has been deactivated.

FIG. 2 is a graph that shows an EM response as a function of time after the EM source has been deactivated. Curve 202 in FIG. 1 represents the EM response for a homogeneous subterranean structure 114 (a subterranean structure in which a resistive body such as body 116 is not present), and curve 204 represents the EM response in the subterranean structure 114 that has a resistive body of interest, such as body 116. Even though the EM source and EM receiver occupy the same location and space, after some amount of time there is substantial separation between curves 202 and 204 indicating that the body of interest 116 can be successfully detected using the source/receiver assembly according to the embodiment of FIG. 1.

Figure 1A:
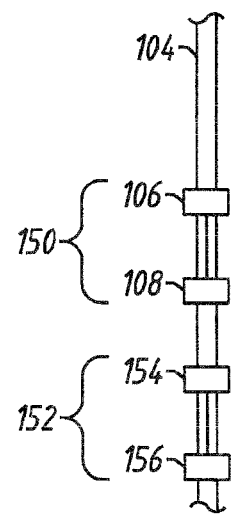
FIG. 1A illustrates an EM source/receiver assembly according to another embodiment.

In FIG. 1, the same set of electrodes 106, 108 are shared by the EM source and EM receiver. In an alternative embodiment, as shown in FIG. 1A, the EM source and the EM receiver do not share the same electrodes. Rather, an EM source 150 uses the pair of electrodes 106 and 108, while an EM receiver 152 uses a separate pair of electrodes 154 and 156. However, in the FIG. 1A embodiment, both the EM source 150 and EM receiver 152 are carried by the same support structure or cable 104. In a different implementation, the EM source 150 and EM receiver 152 are carried by separate support structures.

In the embodiment of FIG. 1A, the EM receiver 152 is still considered to be coincident with the EM source 150 if the EM receiver 152 is near the EM source 150, where near means that the EM source and EM receiver are separated by a distance that is less than one or more of the following: 50 meters, 20 meters, 10 meters, and 5 meters.

In the arrangement of FIGS. 1 and 1A, the EM source/receiver assembly is held in a stationary position in the body of water 110 by the marine vessel 100. A benefit of using a stationary EM source/receiver assembly is that noise caused by movement of electrodes in the body of water 110 is reduced.

Figure 3:
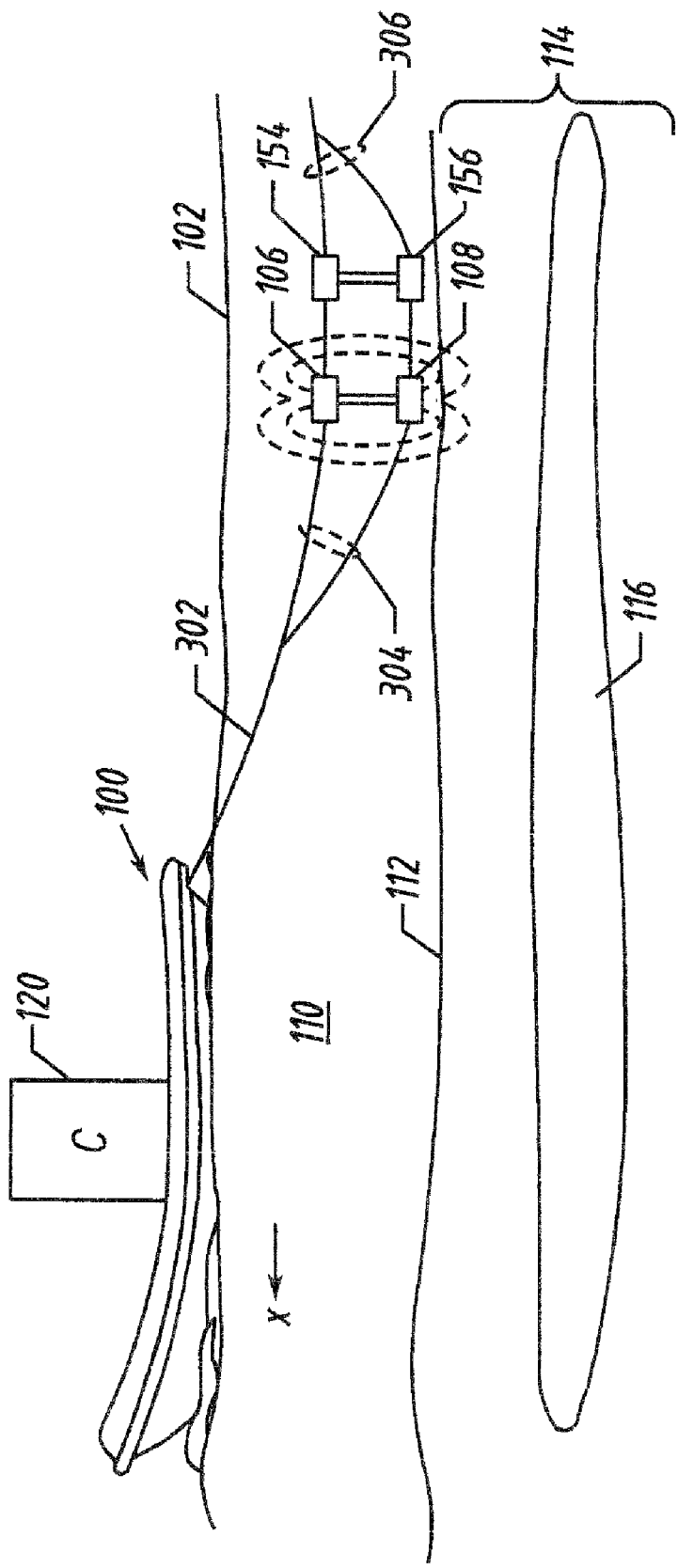
FIG. 3 illustrates another example arrangement for performing a CSEM survey that uses a towed source/receiver assembly, according to another embodiment.

In an alternative embodiment, as shown in FIG. 3, the EM source/receiver assembly can be towed by the marine vessel 100. The towing can be accomplished by using a tow cable 302 that is attached to the electrodes 106, 108, 154, and 156. Each pair of electrodes (106, 108 or 154, 156) is held in a generally vertical orientation by cable segments 304, 306. The electrodes 106 and 108 form the EM source 150, while the electrodes 154 and 156 form the EM receiver 152 (as discussed above). In the towed arrangement, the EM source/receiver assembly is towed through the body of water 110 and a given direction of motion, indicated by x. In the FIG. 3 embodiment, the EM source and EM receiver use separate pairs of electrodes. In an alternative embodiment, the same pair of electrodes 106, 108 is shared by the EM source and EM receiver.

Figure 4:
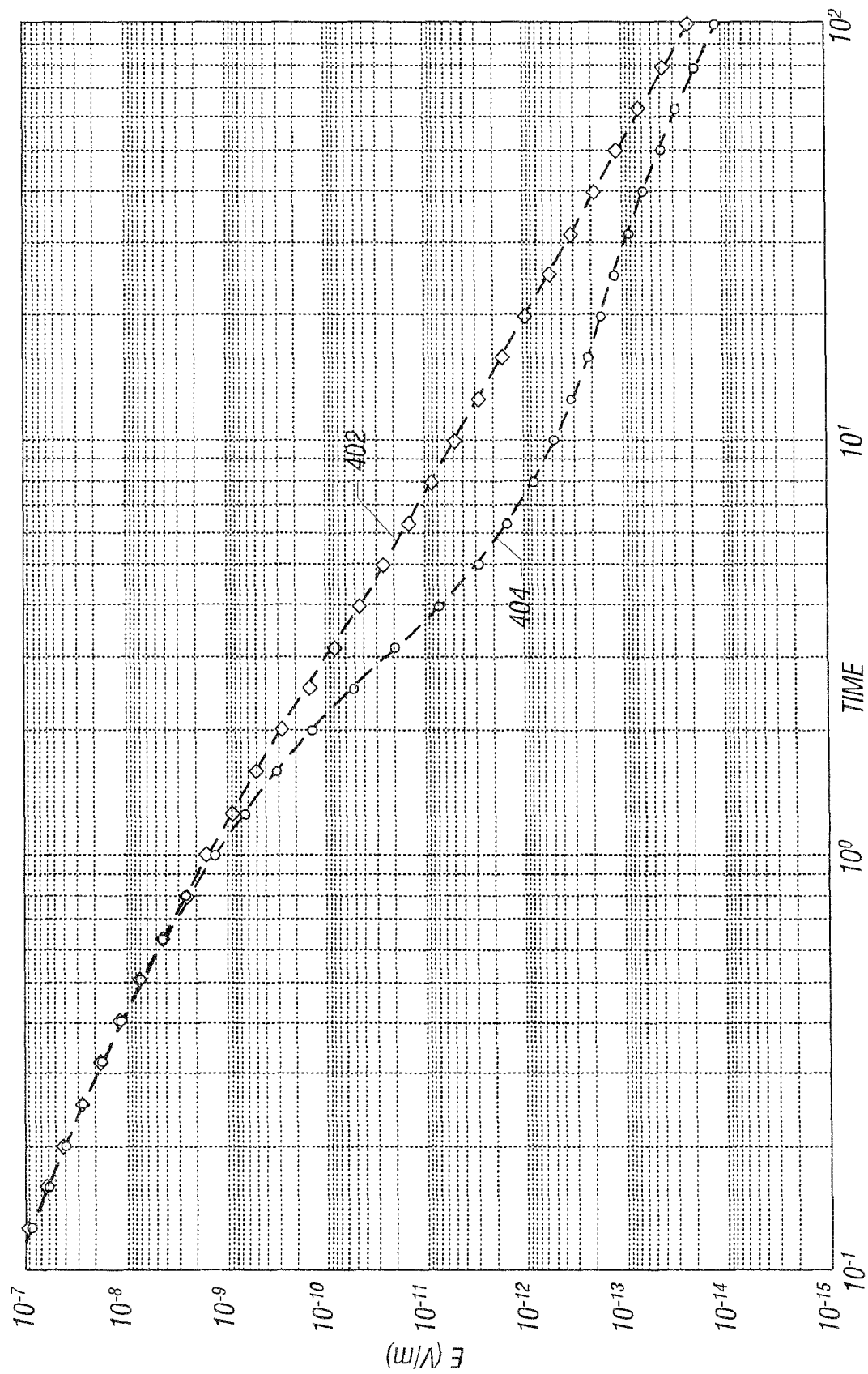
FIG. 4 is a graph illustrating the EM response over time after the EM source of FIG. 3 has been deactivated.

FIG. 4 illustrates the EM response of the assembly shown in FIG. 3 after the EM source has been deactivated. Curve 402 represents the EM response measured by the EM receiver assuming a homogeneous subterranean structure. Curve 404 represents the EM response assuming a subterranean structure that includes a thin resistive body of interest at depth. The graph of FIG. 4 shows similar sensitivity to the subterranean structure as shown in FIG. 2.

In some embodiments, it is noted that magnetometers can be added to the system to measure magnetic fields close to but not on the axis of the EM source.

The foregoing has discussed embodiments in which the EM source is activated and then deactivated to allow the EM receiver to measure a response of the subterranean structure in the absence of the primary field provided by the EM source. In an alternative embodiment, the EM source/receiver assembly can be arranged to continuously transmit a continuous wave. The issue associated with a continuous wave system when a coincident EM source/receiver configuration is used is that the measurements made by the EM receiver are dominated by the primary field (since the EM receiver is either at the same position of the EM source or very near the EM source).

Figure 5:
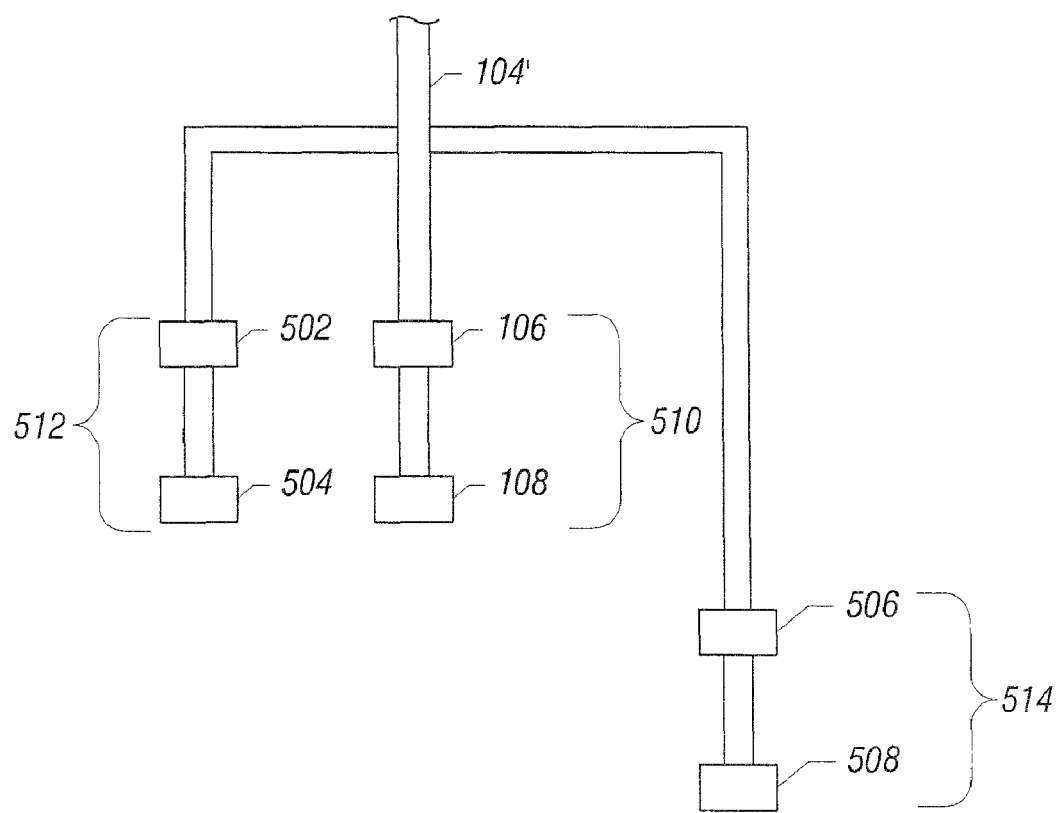
FIG. 5 illustrates yet another arrangement for performing a CSEM survey that uses a source/receiver assembly having a continuous wave source, a main EM receiver, and an auxiliary EM receiver.

In accordance with some embodiments, as shown in FIG. 5, an EM bucking mechanism can be used in which an auxiliary EM receiver 512 (formed of electrodes 502 and 504) is added to the system close to an EM source 510 (formed of electrodes 106 and 108) to measure the primary field of the EM source 510. A main EM receiver 514 (formed of electrodes 506 and 508) is used to measure the response of the subterranean structure 114. In an alternative implementation, the auxiliary EM receiver 512 is designed to measure a field that is less sensitive to the subterranean structure than the field measured by the main EM receiver. The electrodes 106, 108, 502, 504, 506, and 508 are carried by a support structure or cable 104', which can be attached to a marine vessel. Note that the main EM receiver 514 is provided closer to the subterranean structure 114 than the auxiliary EM receiver 512, such that the EM field measured by the auxiliary EM receiver 512 is dominated by the primary field.

The amplitude and phase of the measured field of the auxiliary receiver 512 is adjusted and added in opposition to that of the measurement made by the main receiver 514, such that in the absence of the subterranean structure, no (or little) signal is measured. The adjustment can be performed by a processing entity, such as controller 120 in FIG. 1. Thus, the main EM receiver 514 will measure just the secondary or scattered field which can be analyzed to estimate the subterranean structure conductivity. Other simple electrode arrangements and differencing techniques can be designed that have the same effect.

A similar technique can be applied if multiple measurements of the electric field are made due to one EM source or multiple EM sources. For example, instead of using an electric field measured over the entire length of the EM source, auxiliary electrodes can be added to make measurements of the field at the top of the EM source. Because measurements of the EM field are more sensitive to the zone of interest when the measurements are made closer to the zone, the measurements made at the top of the EM source are going to have less sensitivity to the subterranean structure and more primary field content than the measurements made at the bottom of the EM source. In this instance, the measurements made at the top of the source can be used to buck out the primary field from the measurements made at the bottom of the source. In this implementation, the electrodes at the top of the EM source are considered the electrodes of the auxiliary receiver, while the electrodes at the bottom of the EM source are considered the electrodes of the main receiver.

Figure 6B:
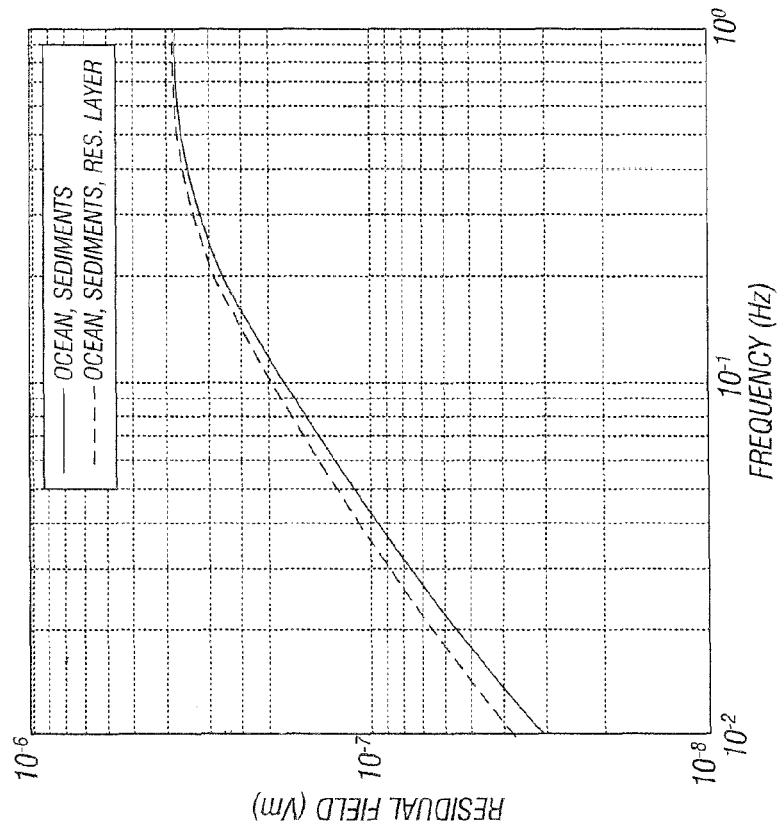
FIGS. 6A-6B are graphs illustrating EM responses as a function of frequency using a conventional EM source/receiver assembly and using the EM source/receiver assembly of FIG. 5, respectively.
Figure 6A:
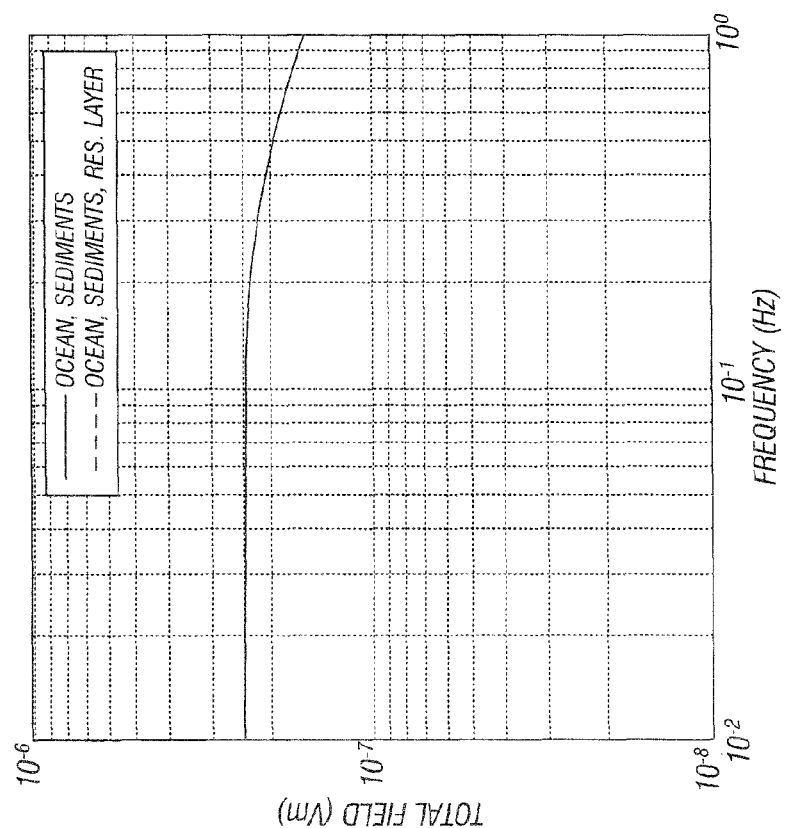

FIGS. 6A and 6B depict graphs for illustrating the bucking technique. Measurements are made at a range of frequencies spreading from near DC to up to 10 Hz. FIG. 6A shows two curves that represent the vertical electrical field measured in response to a continuous wave source as a function of frequency with and without (respectively) a resistive body at depth in the subterranean structure. Note that the two curves of FIG. 6A are indistinguishable.

FIG. 6B shows the result when a bucking process according to an embodiment has been applied. The particular bucking process used calculates the ratio between measurements made by the main and auxiliary receivers at DC, multiplies the field measured at the auxiliary receiver at higher frequencies by this ratio, and subtracts the result from the measurement made at the main receiver. This is just one type of bucking that can be applied. In other implementations, other bucking techniques can be employed.

Figure 7:
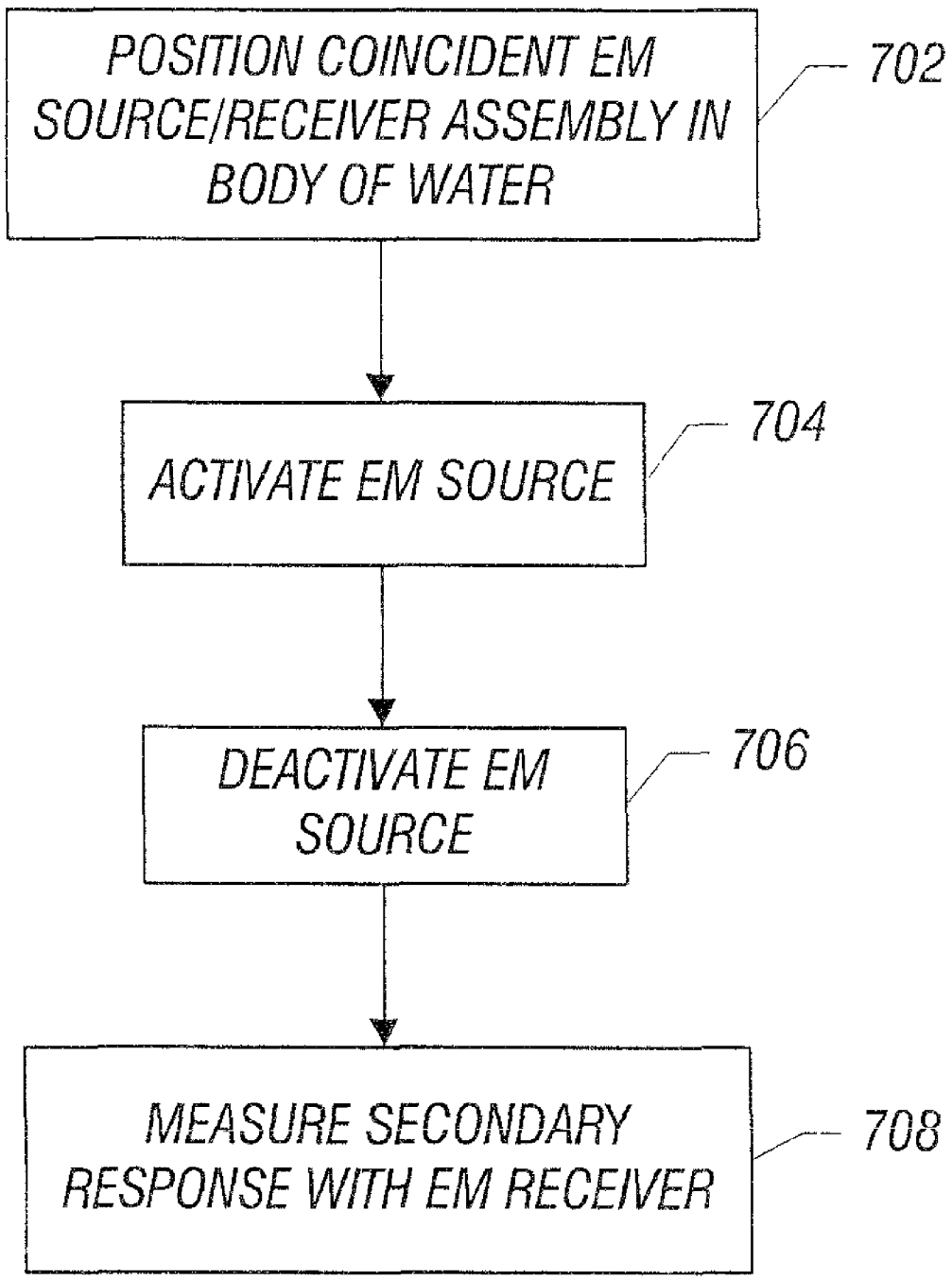
FIGS. 7 and 8 are flow diagrams of processes of performing CSEM surveys, according to some embodiments.

FIG. 7 is a flow diagram of the process of performing a CSEM survey, according to an embodiment. First, the coincident EM source/receiver assembly is positioned (at 702) in the body of water 110. The EM source is then activated (at 704) for some period of time. The EM source is then deactivated (at 706). The EM receiver measures (at 708) the secondary response after the EM source has been deactivated. Note that although reference is made to measuring the secondary response with the EM receiver, note that the EM receiver can also be measuring the response while the EM source is activated. However, it is the EM response measured after deactivation of the EM source that provides information regarding the content of the subterranean structure.

Figure 8:
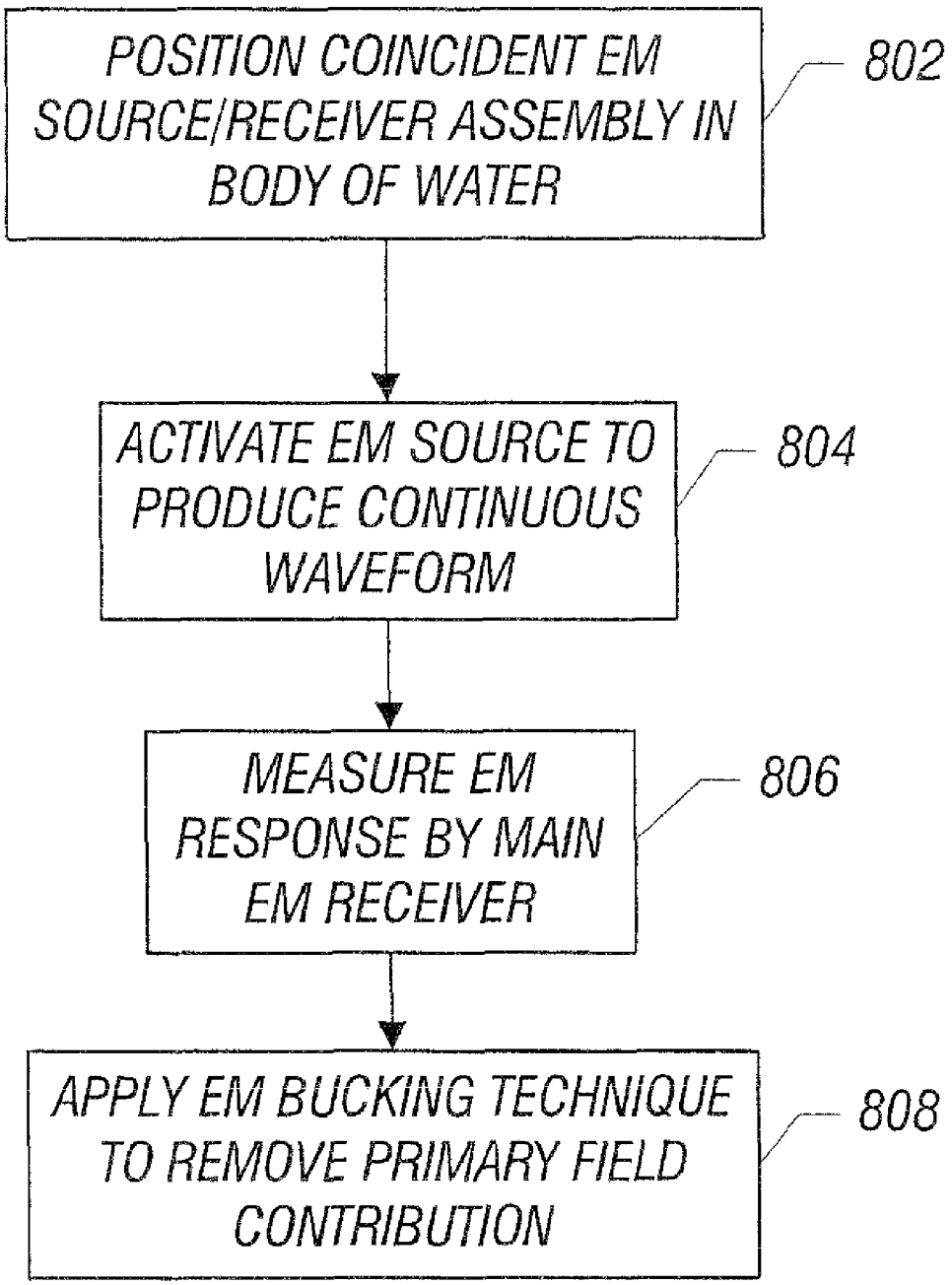

FIG. 8 is a flow diagram of a process performed according to another embodiment. The coincident EM source/receiver assembly is positioned (at 802) in the body of water 110. The EM source is then activated (at 804) to produce continuous waveforms. While the EM source is activated, the EM response of a subterranean structure is measured by a main EM receiver (e.g., 514 in FIG. 5). In addition, an auxiliary EM receiver (e.g., 512 in FIG. 5) is also provided to measure the primary field of the continuous wave source. An EM bucking technique is applied (at 808) to remove the primary field contribution from the measurement taken by the main EM receiver.

Figure 9:
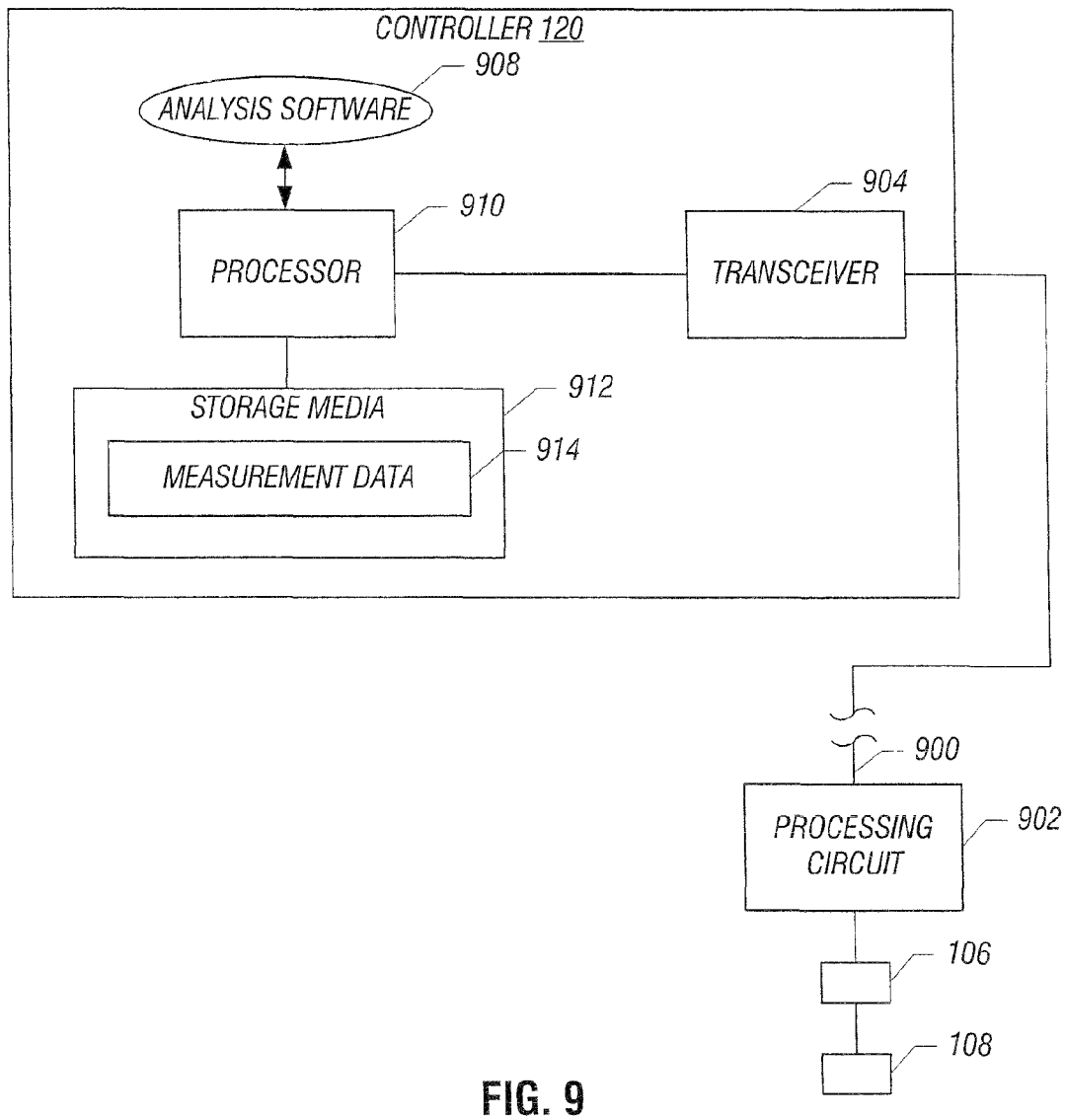
FIG. 9 is a block diagram of a controller to perform certain tasks according to an embodiment.

FIG. 9 illustrates a survey arrangement that includes the controller 120 and electrodes 106, 108 shown in FIG. 1. The controller 120 includes a transceiver 904 for communication over a communication medium 900 (that is part of the support structure or cable 104 of FIG. 1 or the tow cable 302 of FIG. 3) to a processing circuit 902. The processing circuit 902 includes circuitry associated with the EM source and the EM receiver for interaction with the electrodes 106 and 108. The processing circuit 902 can include circuitry to activate or deactivate the EM source (in response to commands from the controller 120). The processing circuit 902 can also include receive circuitry to collect signals measured by the EM receiver.

The controller 120 further includes analysis software 908 executable on a processor 910. The processor 910 is connected to storage media 912, which stores measurement data 914 recorded by the EM receiver that includes electrode 106 and 108.

Instructions of the analysis software 908 are loaded for execution on the processor 910. The processor includes microprocessors, microcontrollers, processor modules or subsystems (including one or more microprocessors or microcontrollers), or other control or computing devices. As used here, a "processor" refers to a single component or to plural components (e.g., one CPU or multiple CPUs in one or multiple computers).

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of performing a marine survey of a subterranean structure, comprising:

positioning a vertically oriented electromagnetic (EM) source in a body of water;

positioning an EM receiver in the body of water, wherein the EM receiver shares at least one electrode with the EM source;

activating the EM source to cause transmission of EM energy into the subterranean structure; and after deactivation of the EM source, measuring, by the EM receiver, an EM field responsive to the EM energy and that is affected by the subterranean structure, wherein the measuring is performed by the at least one electrode of the EM receiver shared with the EM source.

2. The method of claim 1, wherein measuring the EM field comprises measuring the EM field that decays over time while the EM source is deactivated.

3. The method of claim 1, wherein positioning the vertically oriented EM source includes positioning vertically arranged electrodes that provide a vertical dipole.

4. The method of claim 3, wherein the EM receiver shares plural electrodes with the EM source, and wherein the measuring is performed by the plural electrodes shared with the EM source.

5. The method of claim 1, wherein positioning the EM source and the EM receiver comprises providing a stationary EM source and EM receiver in the body of water.

6. The method of claim 1, wherein positioning the EM source and the EM receiver comprises towing the EM source and EM receiver through the body of water.

7. A survey system comprising:
a vertically oriented electromagnetic (EM) source for provision in a body of water;
an EM receiver that shares at least one electrode with the EM source;
a processing circuit configured to activate the EM source to cause transmission of EM energy into a subterranean structure; and
wherein the EM receiver is configured to measure an EM field responsive to the EM energy and that is affected by the subterranean structure, after deactivation of the EM source, wherein the measurement of the EM field is performed by the at least one electrode shared with the EM source.

8. The survey system of claim 7, wherein the EM source includes a pair of electrodes that are vertically oriented to provide a vertical dipole.

9. The survey system of claim 8, wherein the EM receiver shares the pair of electrodes of the EM source.

10. The survey system of claim 7, further comprising a support structure or cable to carry the EM source and EM receiver in the body of water.

11. A survey system comprising:
a continuous wave electromagnetic (EM) source, wherein the continuous wave EM source is vertically oriented and is for provision in a body of water;
a main EM receiver to measure an EM field responsive to the EM source that is affected by a subterranean structure;
an auxiliary EM receiver to measure a particular field that is less sensitive than the EM field measured by the main EM receiver to the subterranean structure; and
a controller to apply bucking based on measurements of the main EM receiver and the auxiliary EM receiver to remove the particular field from the measurement of the main EM receiver through a differencing procedure.

12. The survey system of claim 11, wherein the main EM receiver is positioned closer to the subterranean structure than the auxiliary EM receiver.

13. The survey system of claim 11, wherein the differencing procedure adds the measurement of the auxiliary EM receiver in opposition to the measurement of the main EM receiver.

14. The method of claim 1, wherein the measuring is performed by the at least one electrode of the EM receiver shared with the EM source, and at least another electrode of the EM receiver.

15. The survey system of claim 7, wherein the measurement is performed by the at least one electrode of the EM receiver shared with the EM source, and at least another electrode of the EM receiver.

* * * * *